Patented Jan. 11, 1927.

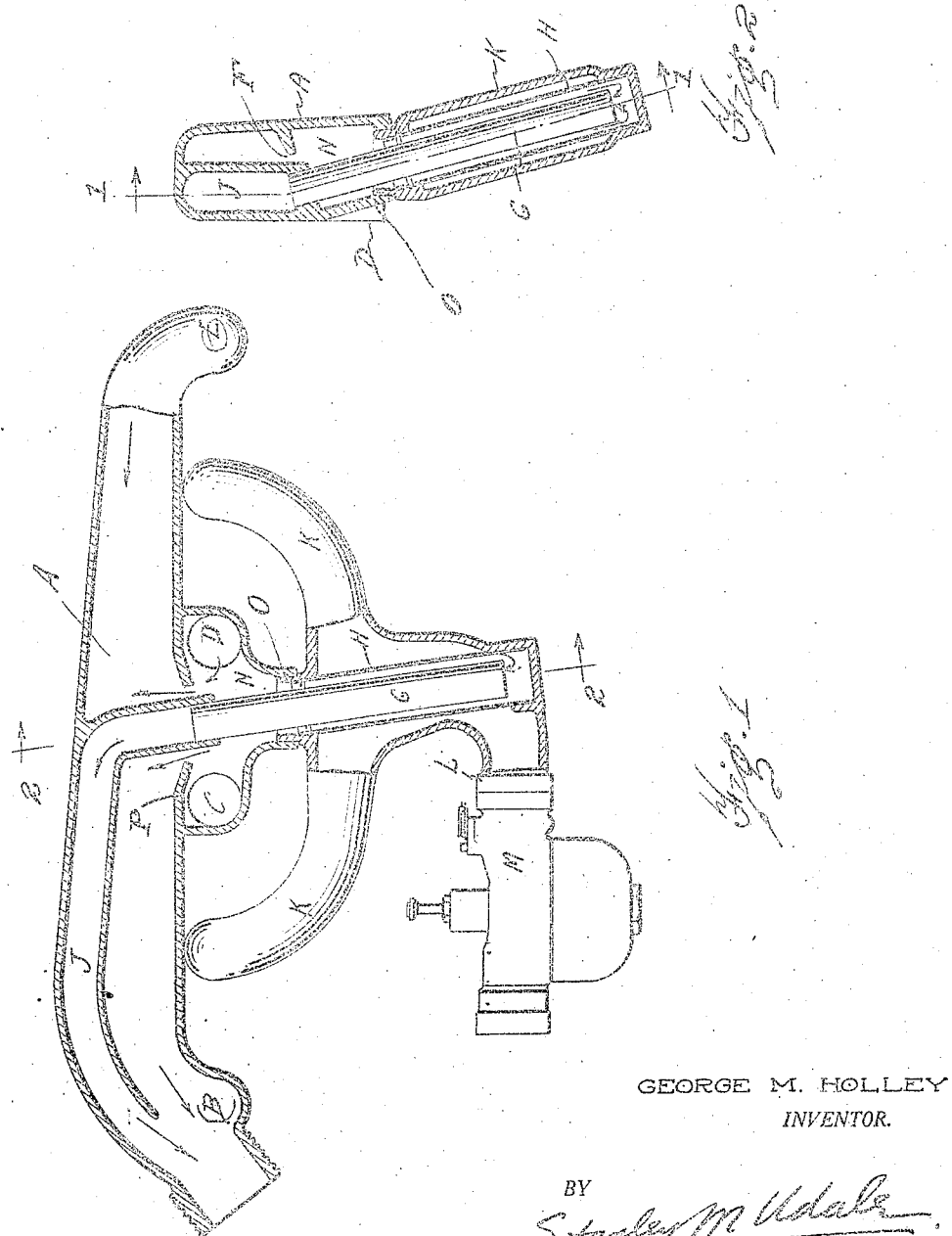

1,613,796

UNITED STATES PATENT OFFICE.

GEORGE M. HOLLEY, OF DETROIT, MICHIGAN.

INTAKE-MANIFOLD HEATER.

Application filed December 7, 1923. Serial No. 679,110.

This invention relates to an improvement in an exhaust manifold of the type in which a portion of the exhaust gases is bypassed through the inlet manifold.

The specific object of this invention is to provide simple and easily assembled means whereby a small percentage of the exhaust gases may be returned to the main exhaust pipe after having delivered its heat in the intake manifold, instead of escaping to the atmosphere where its presence is objectionable for many reasons.

Figure 1 shows a partial cross sectional elevation on plane 1—1 of Figure 2 of the application of the invention to a four cylinder engine of a well known type.

Figure 2 shows a sectional elevation on plane 2—2 of Figure 1.

The exhaust manifold, which comprises the compartments A and N, has four exhaust entrances B, C, D, and E. The two center exhaust entrances, C and D, discharge into the compartment N, which compartment is connected to the compartment A through a restricted annular opening F. Through this opening passes a tube G. From the compartment N there depends a closed tube H into which the tube G extends. The tube G extends into the compartment A of the exhaust manifold so as to connect with the cored passage J. This cored passage is arranged so as to deliver the exhaust gases into the outlet of the exhaust manifold.

The intake manifold K completely surrounds the heating element H. This manifold K is provided with an inlet flange L to which is bolted a horizontal carbureter M of a well known type, and is also provided with a projecting sleeve O which fits into a corresponding opening in the compartment N of the exhaust manifold. The chamber N is separated from the main body of the exhaust manifold A by a diaphragm P.

Operation.—In operation the exhaust is discharged from B, from C, from E, and from D successively. When the exhaust gases are discharged from C or from D, owing to the restriction at F, a portion of the exhaust from these two cylinders is diverted and flows down H, parting with its heat to the fuel mixture drawn in through the intake manifold K. The cooled exhaust is drawn up G, into J, and out of the exhaust manifold.

To a certain extent the exhaust gases flowing down H and up G are under the influence of the ejector action of the exhaust gases from C, D, and E flowing through A past the outlet from the cored passage J. The ejector action, combined with the annular obstruction at F, determines what percentage of exhaust gases escaping at C and D are diverted down H through G, and out J. A percentage of from 10% to 30% is desired, depending on the fuel used.

The exhaust gases flowing out of the ports B, C, D, and E are necessarily intermittent, thus giving a pulsating flow. The effect of this pulsating flow will cause quite a low pressure to exist at B at a time when there is a considerable pressure in N due to the fact that either C or D is supplying exhaust gases to N. This will produce quite a considerable flow of exhaust gases down H and up G. Furthermore, being a pulsating flow and not a steady flow, the tendency for water to condense and collect in the lower portion of H will be counteracted.

What I claim is:

A vaporizer adapted for a multicylinder internal combustion engine, comprising an inlet manifold, an exhaust manifold, a diaphragm within said exhaust manifold having a restricted opening therein through which one of the exhaust inlets communicates with the main body of the exhaust manifold, an elongated chamber connected with said exhaust manifold adjacent to said exhaust inlet, said chamber being in heat conducting relationship with said manifold, a passage connected to the end of said elongated chamber with the outlet from said manifold, whereby the ejector action of the exhaust flowing out of the exhaust manifold causes a circulation of exhaust gases through said elongated chamber.

In testimony whereof I affix my signature.

GEORGE M. HOLLEY.